(12) United States Patent
Spreen

(10) Patent No.: US 11,452,369 B2
(45) Date of Patent: Sep. 27, 2022

(54) TELESCOPIC TABLE FRAME PART, METHOD FOR PRODUCING A SLIDING GUIDE, AND APPARATUS FOR CARRYING OUT THE METHOD

(71) Applicant: Oelschläger Metalltechnik GmbH, Hoya/Weser (DE)

(72) Inventor: Andreas Spreen, Sternwehe-Oppenwehe (DE)

(73) Assignee: Oelschläger Metalltechnik GmbH, Hoya/Weser (DE)

( * ) Notice: Subject to any disclaimer, the term of this patent is extended or adjusted under 35 U.S.C. 154(b) by 0 days.

(21) Appl. No.: 16/951,743

(22) Filed: Nov. 18, 2020

(65) Prior Publication Data

US 2021/0068533 A1    Mar. 11, 2021

Related U.S. Application Data

(62) Division of application No. 16/080,579, filed as application No. PCT/DE2017/100095 on Feb. 9, 2017, now Pat. No. 10,869,548.

(30) Foreign Application Priority Data

Feb. 29, 2016 (DE) .......................... 102016103566.1

(51) Int. Cl.
| | |
|---|---|
| *F16M 13/00* | (2006.01) |
| *A47B 9/20* | (2006.01) |
| *B29C 70/84* | (2006.01) |
| *F16C 29/02* | (2006.01) |
| *A47B 13/02* | (2006.01) |

(52) U.S. Cl.
CPC ................ *A47B 9/20* (2013.01); *A47B 13/02* (2013.01); *B29C 70/84* (2013.01); *F16C 29/02* (2013.01); *F16C 2314/70* (2013.01); *F16C 2316/10* (2013.01)

(58) Field of Classification Search
CPC   A47B 9/20; A47B 13/02; B29C 70/84; F16C 29/02; F16C 2314/70
See application file for complete search history.

(56) References Cited

U.S. PATENT DOCUMENTS

| | | | | |
|---|---|---|---|---|
| 7,096,773 | B2 * | 8/2006 | Wang .................. | F15B 15/1428 91/437 |
| 2006/0075891 | A1 * | 4/2006 | Wang .................... | F15B 15/202 91/437 |
| 2016/0290377 | A1 * | 10/2016 | Ng ............................ | F16B 7/14 |

* cited by examiner

*Primary Examiner* — Amy J. Sterling
(74) *Attorney, Agent, or Firm* — Jonathan M. D'Silva; MMI Intellectual Property

(57) ABSTRACT

A telescopic table frame part, in particular a height-adjustable table leg (26), comprising an outer tube (12) and an inner tube (10) which can be moved relative to the former and which is guided by means of a sliding guide, characterized in that the sliding guide comprises at least one injection-molded sliding element (24) made from a slide-promoting plastic, a method for producing a sliding guide for guiding an inner tube (10) in an outer tube (12) movable relative thereto of a telescopic table frame part, comprising attaching of at least one sliding element (24) made from a slide-promoting plastic onto the inner surface (23) of the outer tube (12) or onto the outer surface (25) of the inner tube (10) by injection molding, wherein said plastic is introduced into the inside of the inner tube through an injection molding tool access opening (16) in same, and an apparatus for carrying out the method.

5 Claims, 12 Drawing Sheets

Figure 1:
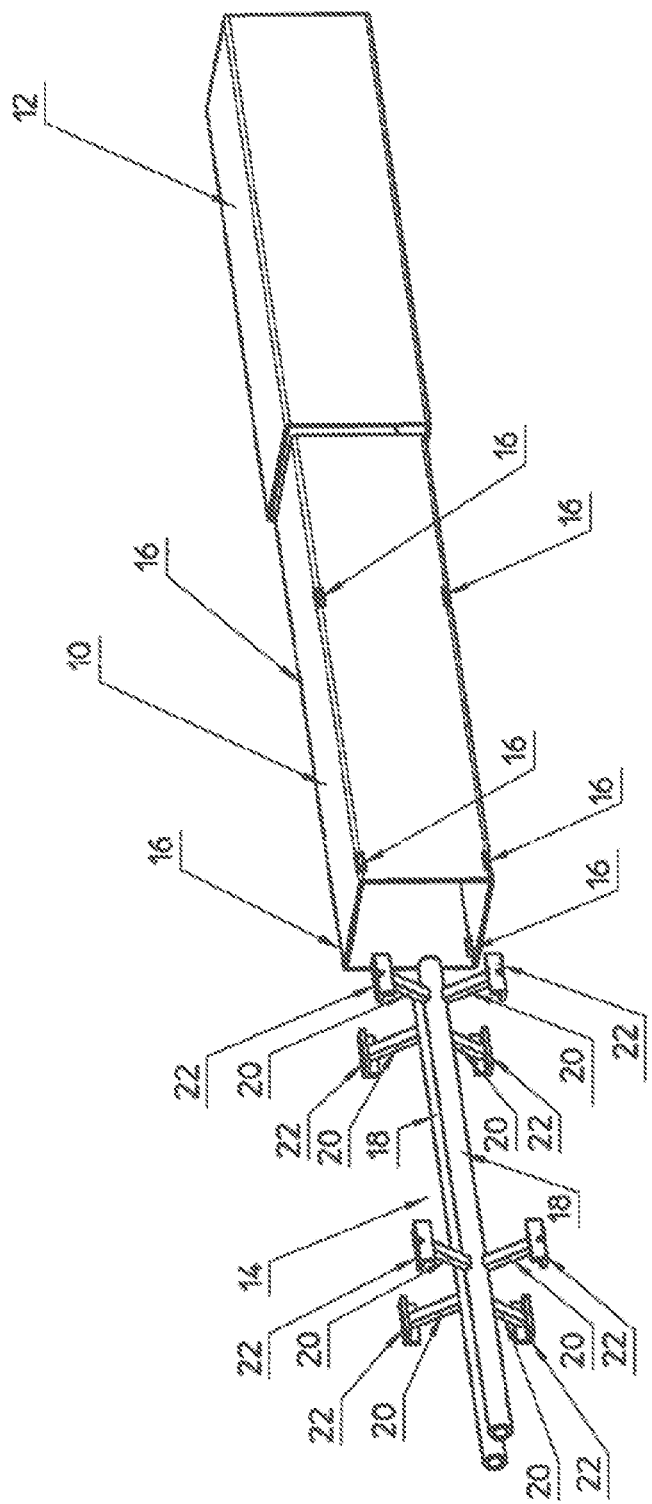

TELESCOPIC TABLE FRAME PART, METHOD FOR PRODUCING A SLIDING GUIDE, AND APPARATUS FOR CARRYING OUT THE METHOD

The present invention relates to a telescopic table frame part, in particular a height-adjustable table leg, comprising an outer tube and an inner tube which can be moved relative thereto and which is guided by means of a sliding guide, a method for producing a sliding guide for guiding an inner tube in an outer tube movable relative thereto of a telescopic table frame part, and an apparatus for carrying out the method. The inner and/or the outer tube can be produced from steel, for example.

In the case of a telescopic table frame part of the kind mentioned above, the sliding guide often consists of one or more sliding element(s), especially of a slide-promoting plastic, which is/are produced in advance and is/are fastened on the inner surface of the outer tube or on the outer surface of the inner tube, before an inner tube is shoved into the outer tube or the outer tube is shoved over an inner tube.

The problem which the present invention proposes to solve is to modify a telescopic table frame part of the kind mentioned above so that it is more economical to produce.

According to the invention, this problem is solved for the telescopic table frame part of the kind mentioned above in that the sliding guide comprises at least one injection-molded sliding element made from a slide-promoting plastic. Alternatively to injection molding, a 3D-printing process could also be used.

Furthermore, this problem is solved by a method for producing a sliding guide for guiding an inner tube in an outer tube movable relative thereto of a telescopic table frame part, comprising attaching of at least one sliding element made from a slide-promoting plastic onto the inner surface of the outer tube by injection molding, wherein said plastic is fed into the inside of the inner tube through an injection molding tool access opening in same. The inner tube and the outer tube may be held in position relative to each other during the injection molding, e.g., in that the inner tube is held by an injection molding tool or a tool in general and/or the outer tube is positioned in an apparatus from the outside. In order for the (injected) plastic to remain sticking or adhering only to one of the surfaces (outer surface of the inner tube or inner surface of the outer tube), it is conceivable for the inner tube to be moved during the injection molding, when the sliding element is supposed to be applied on the inner surface of the outer tube, and for the outer tube to be moved during the injection molding, when the sliding element is supposed to be applied on the outer surface of the inner tube. Alternatively or additionally, the respective surface (outer surface of the inner tube or inner surface of the outer tube) could also be especially coated in order to prevent an adhering of the plastic.

The problem is also solved by an apparatus for carrying out the method, comprising an injection lance with at least one preferably straight feed tube, from which at least one distributing tube emerges at the side, preferably at a right angle.

It may be provided for the table frame part that the outer tube and the inner tube are round tubes.

Alternatively, the outer tube and the inner tube may be polygonal tubes, especially rectangular tubes.

Advantageously, the sliding element is secured on the inner surface of the outer tube, in particular wherein the outer tube has indentations on its inner surface to at least partly receive the at least one sliding element. The fastening can be done, for example, by curing the plastic on the inner surface of the outer tube.

Alternatively, the sliding element may be fastened on the outer surface of the inner tube, especially wherein the inner tube has indentations on its outer surface to at least partly receive the at least one sliding element.

Advantageously, the outer tube has indentations on its inner surface to at least partly receive the at least one sliding element.

Advantageously, several sliding elements are arranged circumferentially in a radial plane, preferably at equal distances. For example, the sliding elements may also be arranged in several radial planes in groups. For example, there may be an angle offset between successive groups of sliding elements in the axial direction.

Advantageously, the at least one sliding element has the shape of a plate.

Advantageously, the inner tube has at least one injection molding tool access opening for the injection molding of the sliding element.

It may be provided in the method that the outer tube and the inner tube are interlocked prior to the injection molding. For example, the inner tube is shoved into the outer tube. But it is also possible, for example, to shove the outer tube over the inner tube.

If more than one sliding element is to be applied, these are advantageously injection molded simultaneously.

Advantageously, an injection molding tool and the inner tube are moved relative to each other so that the injection molding tool is situated inside the inner tube. For example, the injection molding tool may be shoved into the interior of the inner tube or the inner tube may be shoved together with the outer tube over the injection molding tool.

Preferably, the injection molding tool comprises an injection lance.

Advantageously, the plastic is actively cured. For example, UV light may be used therefor.

Finally, it may be provided in the apparatus that the distributing tube has a cup-shaped mouth. This is advantageous in order to bound or to define the outer contour of the sliding element to be injection molded.

The present invention is based on the surprising insight that the costs for the production of a telescopic table frame part and especially for its sliding guide can be reduced by a kind of "sliding guide direct injection". In the prior art, normally sliding elements of different thicknesses need to be kept on hand (stored) and installed individually. With the method according to the present invention, sliding elements of any given thickness and tolerance compensation can be easily produced.

Figure 2:
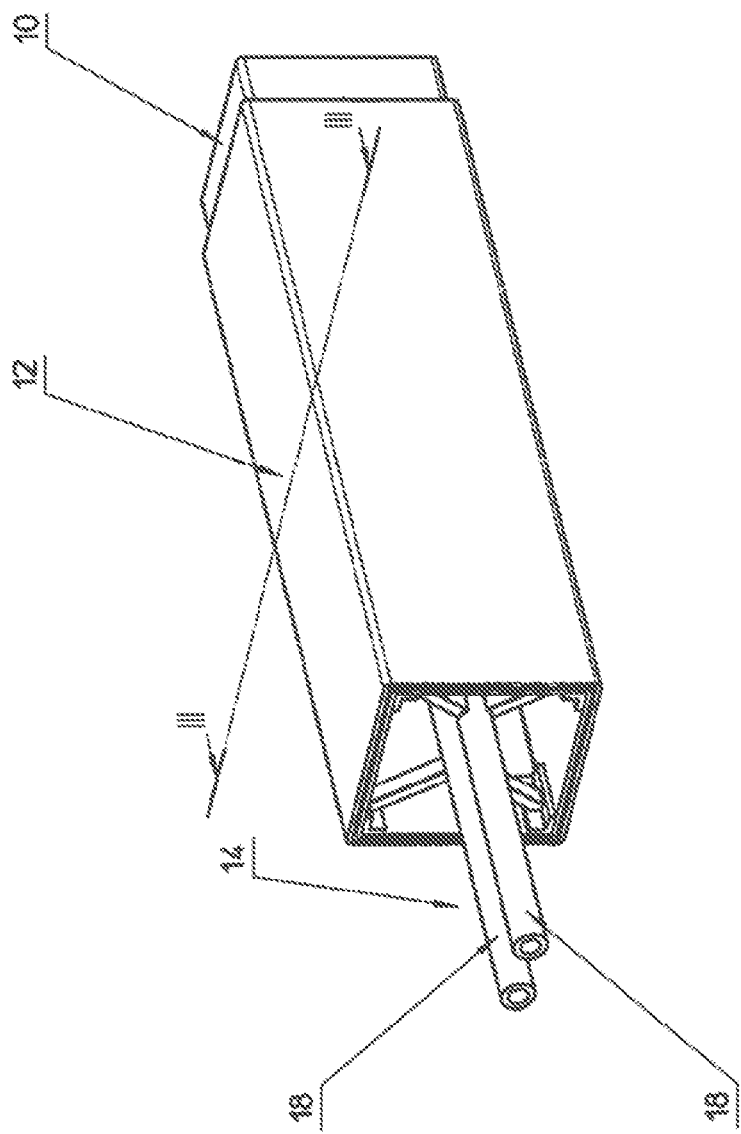
Figure 3:
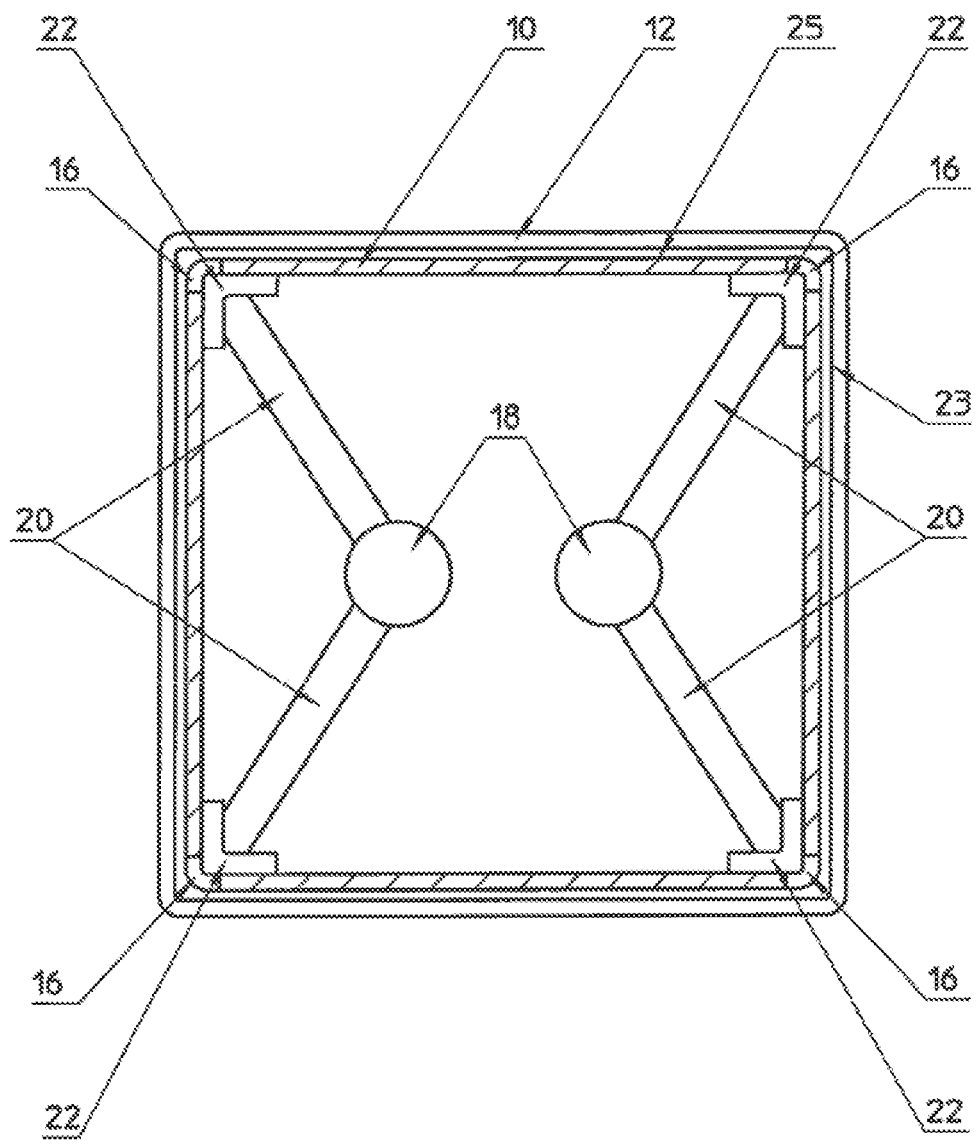
Figure 4:
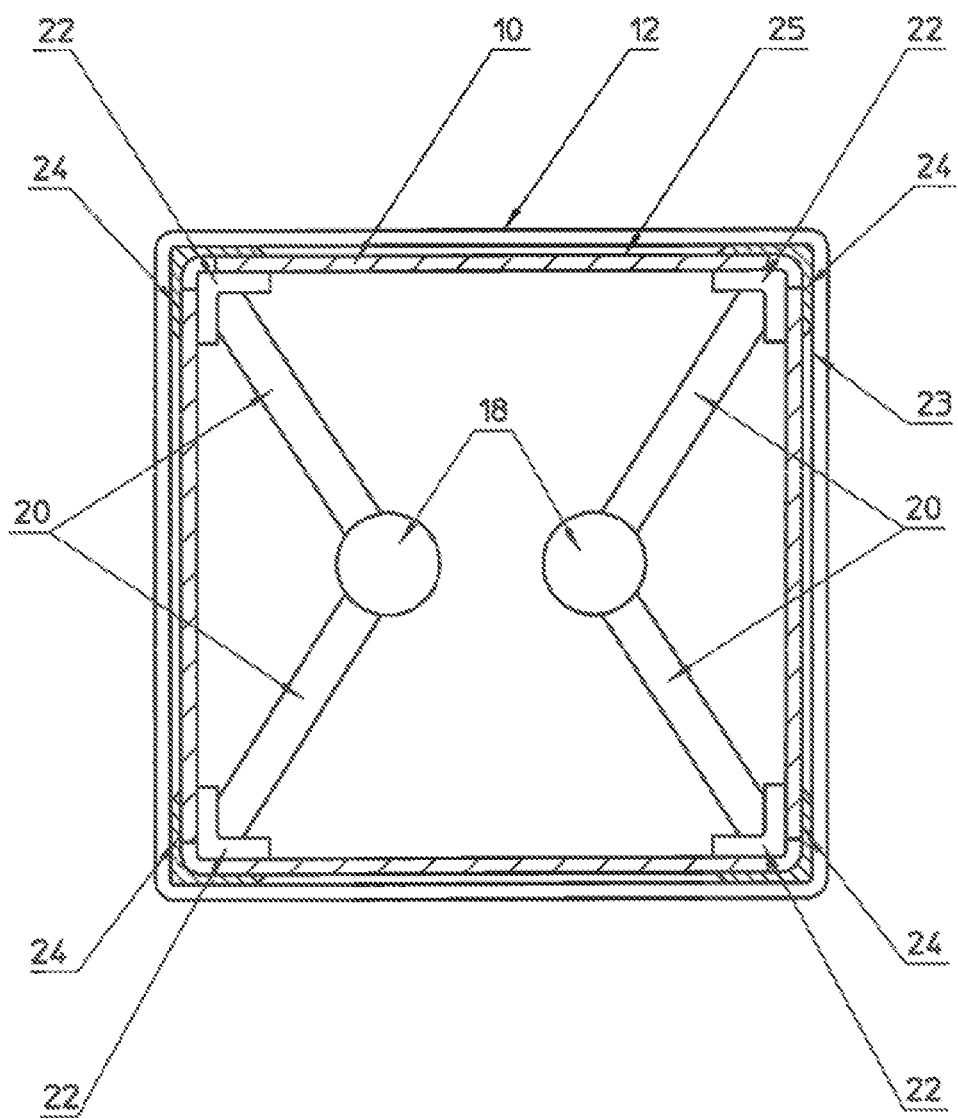
Figure 5:
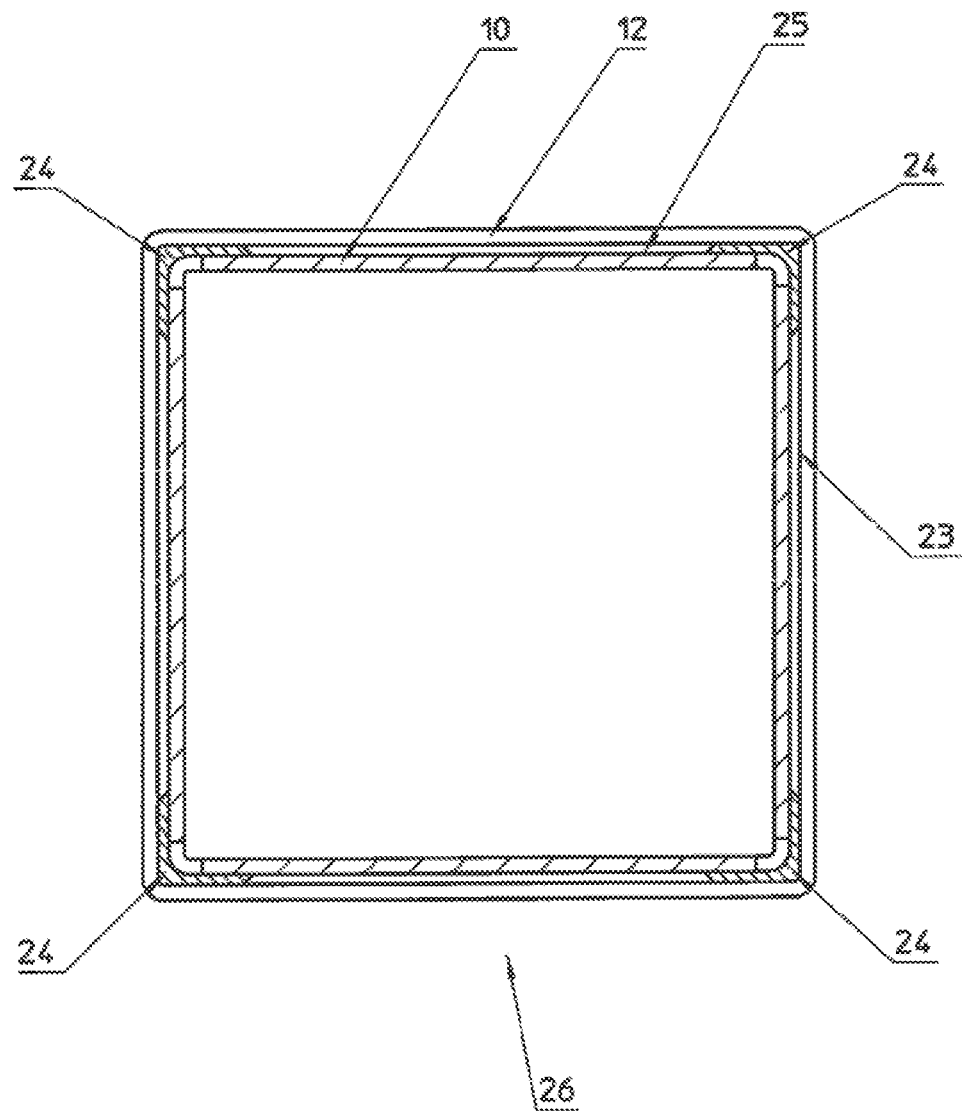
Figure 6:
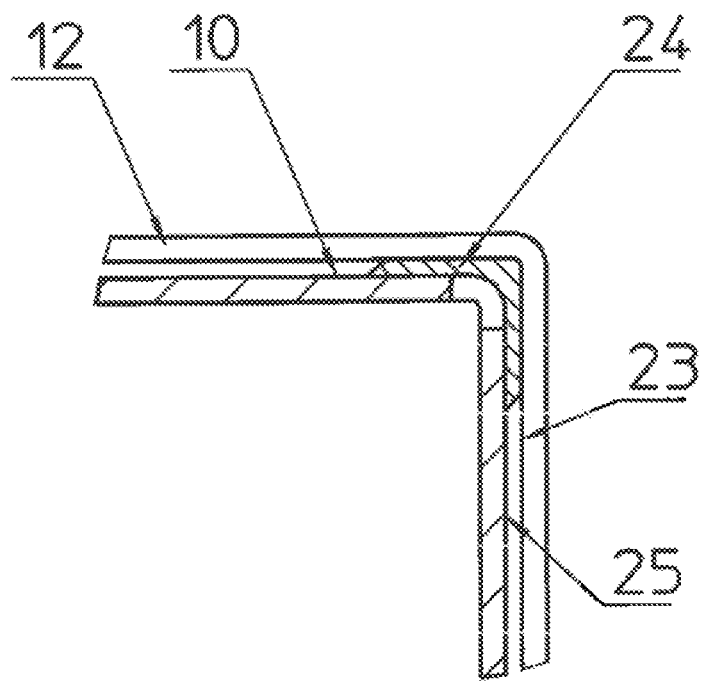
Figure 7:
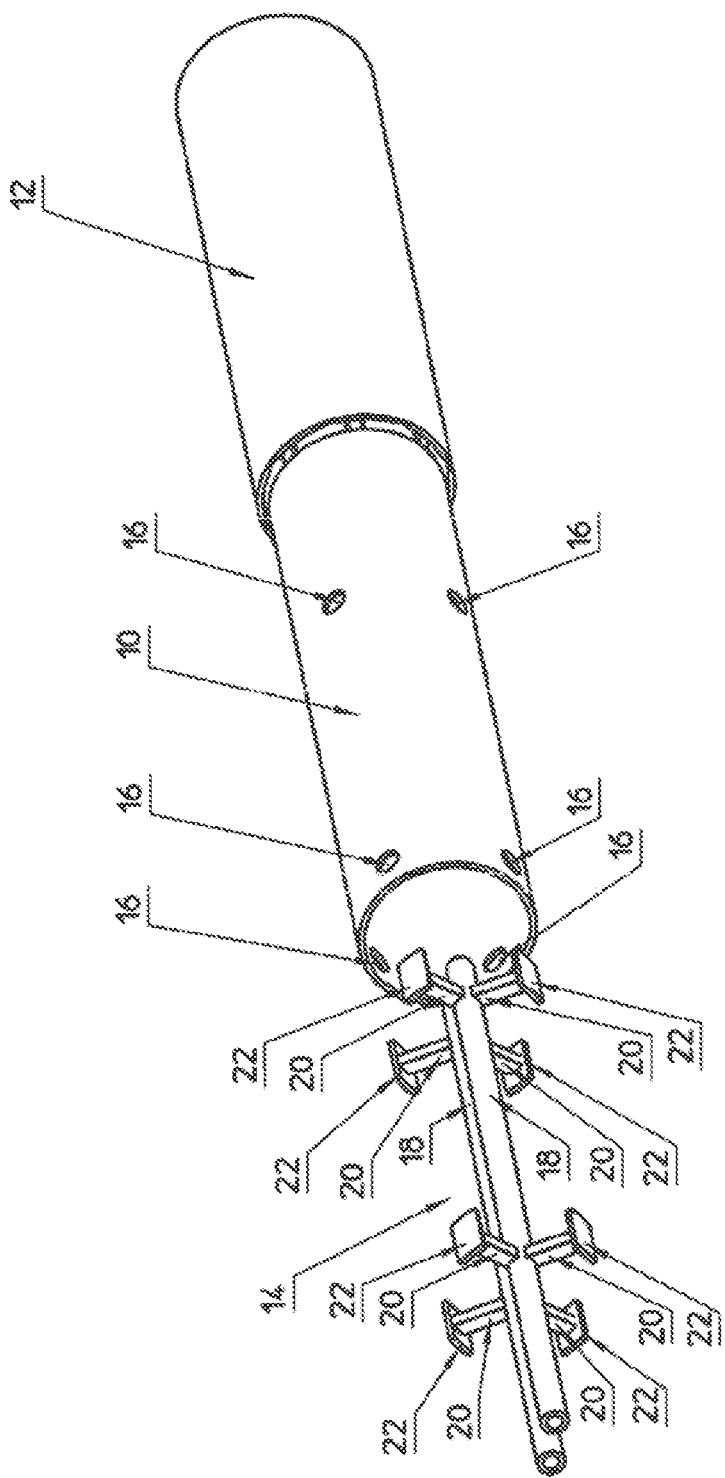
Figure 8:
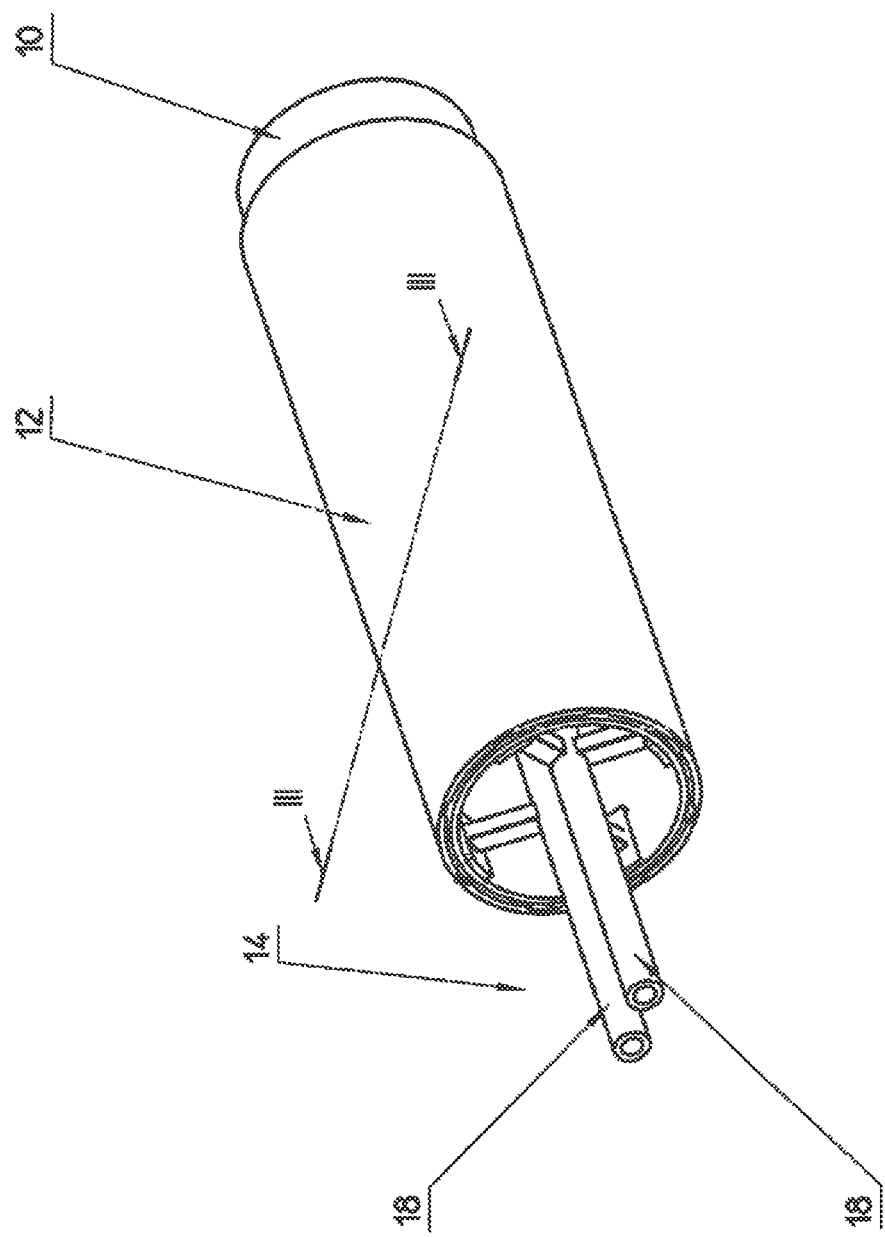
Figure 9:
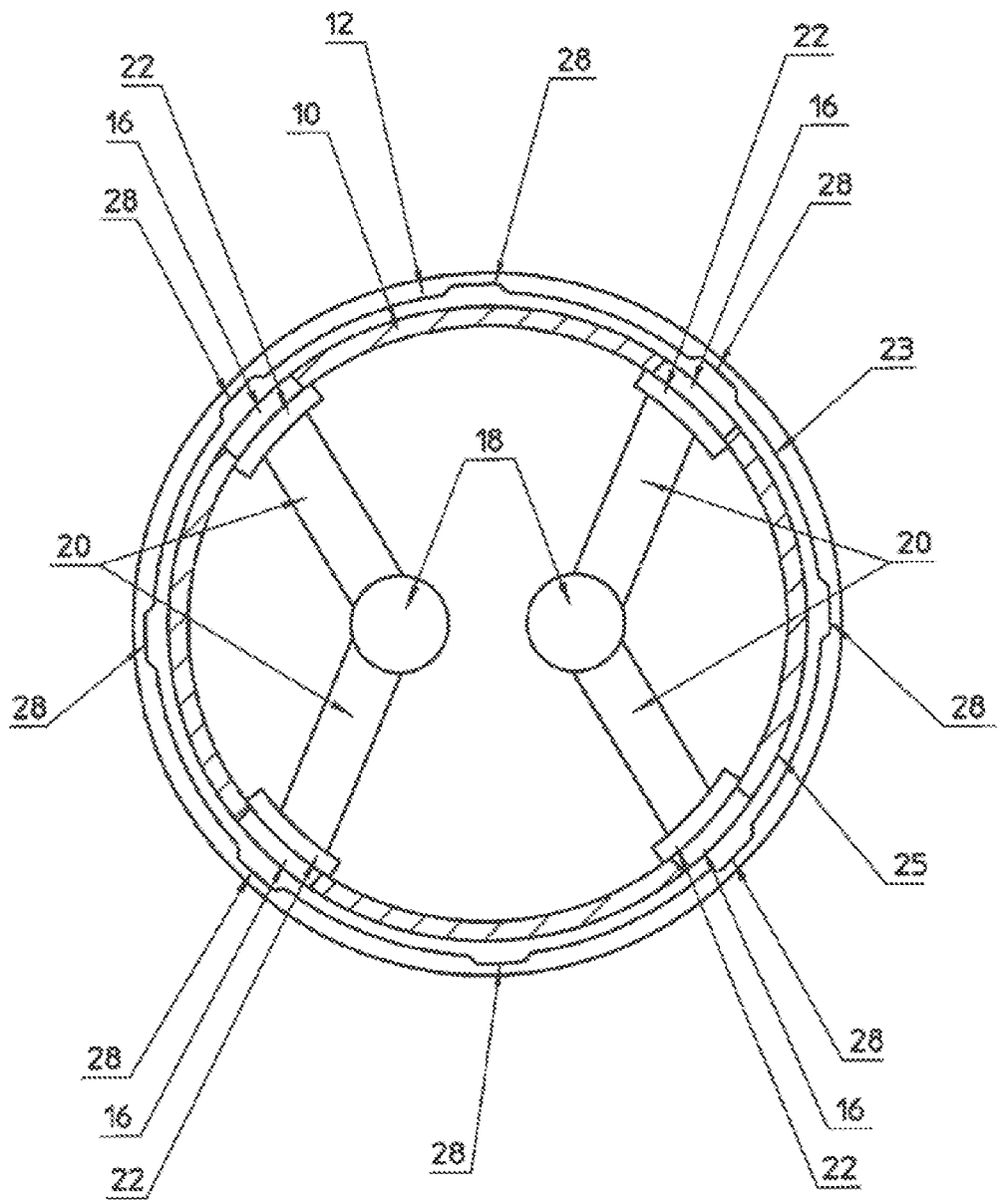
Figure 10:
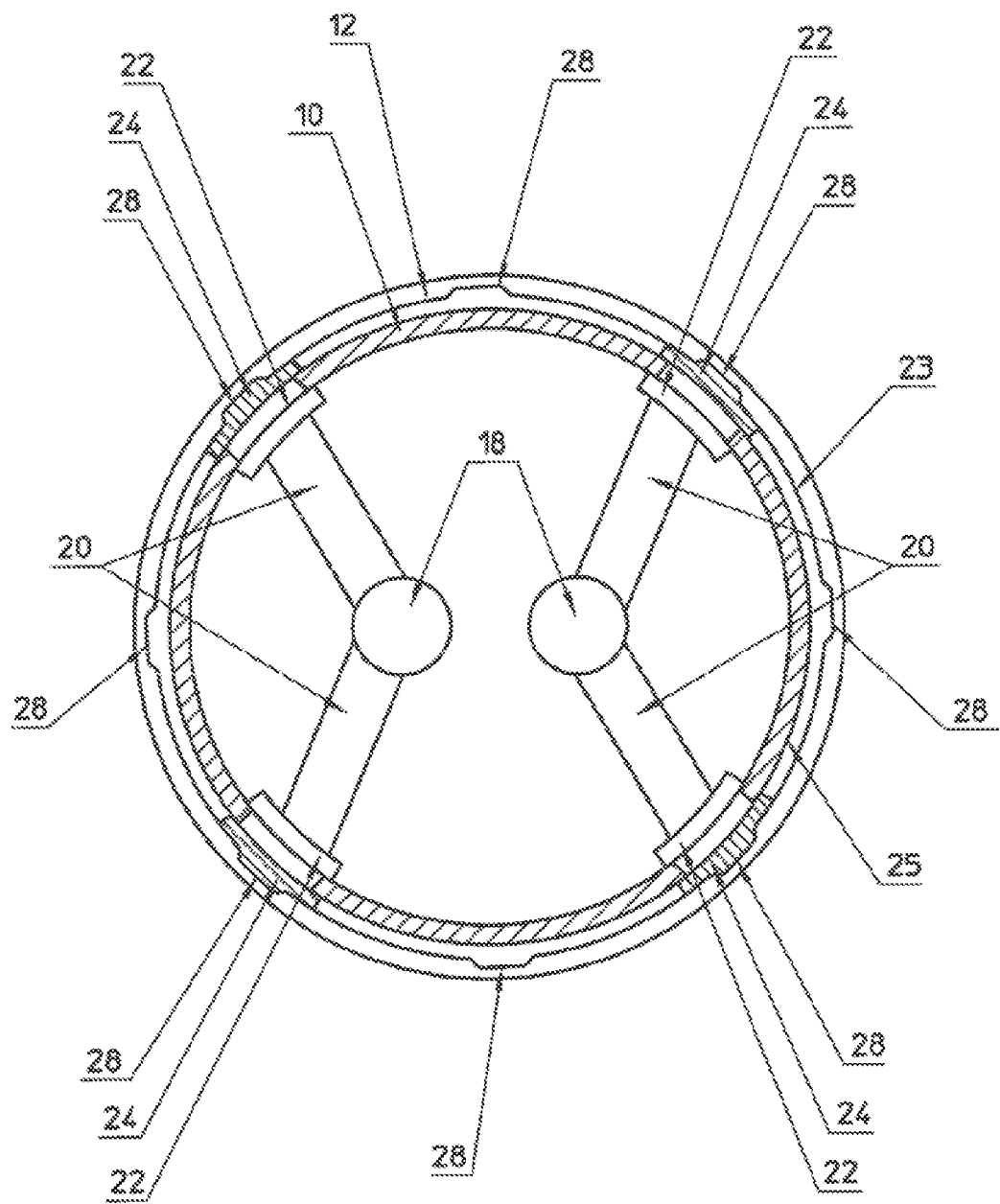
Figure 11:
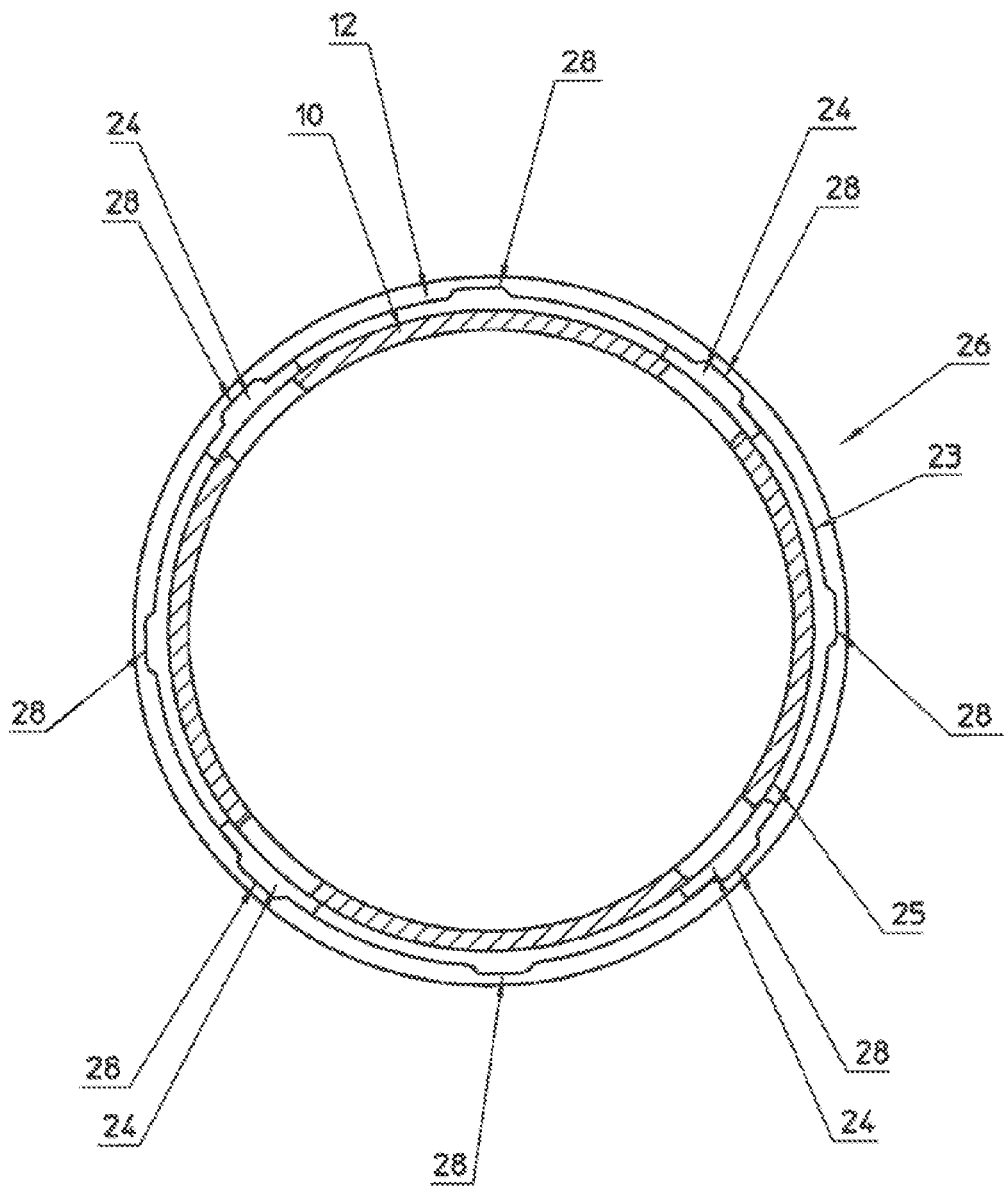
Figure 12:
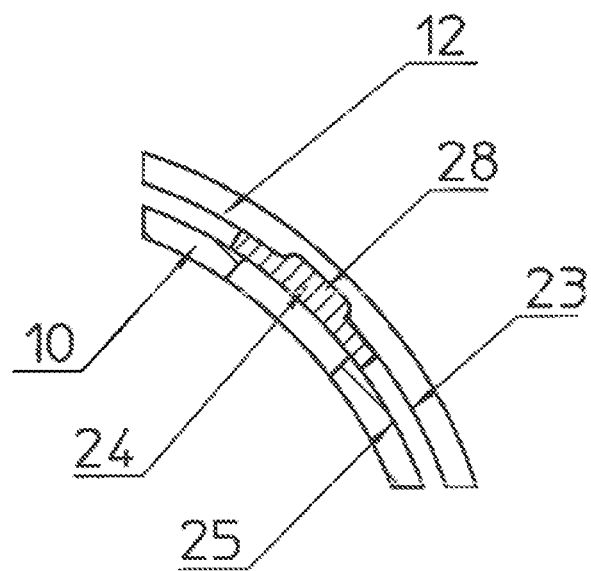

Further features and benefits of the invention emerge from the appended claims and the following description, in which several exemplary embodiments of the present invention are described with the aid of the schematic drawings. There are shown:

FIG. 1, a perspective view of an inner tube and an outer tube in a stage of a method for producing a sliding guide for guiding the inner tube in the outer tube movable relative thereto of a telescopic table frame part according to one embodiment of the present invention;

FIG. 2, the inner tube and the outer tube of FIG. 1 in a later stage of the method in perspective view;

FIG. 3, a sectional view along the line prior to an injection or injection molding of slide-promoting plastic;

FIG. 4, a view similar to FIG. 3, but after an injection of slide-promoting plastic;

FIG. 5, a sectional view similar to FIG. 3 or FIG. 4, but after fabrication of a sliding guide;

FIG. 6, a detail view of FIG. 3; and

FIGS. 7 to 12, similar views to FIGS. 1 to 6, but with different inner and outer tubes.

In FIG. 1, an inner tube 10 fashioned as a rectangular tube (square tube) is being shoved into an outer tube 12, likewise fashioned as a rectangular tube (square tube). The outer diameter of the inner tube 10 is smaller than the inner diameter of the outer tube 12. For the feeding of slide-promoting plastic or for the feeding of an injection molding tool, which in this example comprises an injection lance 14, the inner tube 10 comprises several openings. In the present example, these are openings, known here as injection molding tool access openings 16, in the four corners of the rectangular tubes. In this example, the injection molding tool access openings 16 are arranged in several groups, spaced apart in the axial direction. Each group consists of four injection molding tool access openings 16, which in this example are arranged around the circumference at equal distances. Each of the injection molding tool access openings 16 in this example has a rectangular contour. However, they could also have a different contour.

The injection lance 14 comprises two feed tubes 18 running parallel to each other, from which two distributing tubes 20 emerge in each case at a right angle in a respective radial plane (see FIGS. 3 and 4). Each of the distributing tubes 20 has a cup-shaped mouth 22. But the injection lance 14 could also have only one feed tube, or more than two feed tubes. The distributing tubes 20 and the mouths 22 are configured and arranged such that, when the injection lance 14 is properly arranged in the inner tube 10, the mouths 22 protrude to the outside through the injection molding tool access openings 16 and lie against the inner surface 23 of the outer tube 12, in order to limit the spreading out of the plastic and thereby define the outer contour of a resulting sliding element 24 (see FIGS. 4 to 6). But the mouths 22 may also be shaped differently. For example, they might be configured such that the plastic enters without guidance through the injection molding tool access opening 16.

FIG. 2 shows the situation in which the inner tube 10 and the outer tube 12 are already interlocked and the injection lance 14 is already arranged in the inner tube. But as of yet, no plastic has been injected via the injection lance 14 (see FIG. 3). FIG. 4 now shows the situation after the injection of plastic for producing the sliding elements 24 before removing the injection lance 14.

In FIGS. 5 and 6, a finished telescopic table frame part is shown in principle, being in this example a height-adjustable table leg 26, comprising the outer tube 12 and the inner tube 10 movable relative thereto and guided by means of a sliding guide. The sliding guide comprises the injection-molded sliding elements 24 made of slide-promoting plastic. The sliding elements 24 are fashioned as angles.

FIGS. 7 to 12 show a variant in which the inner tube 10 is fashioned as a round tube and the outer tube 12 is likewise fashioned as a round tube. On the inner surface 23 of the outer tube 12 there are formed indentations 28 for receiving at least part of the injected plastic. This may be of advantage for an especially secure connection of the plastic to the outer tube 12. The indentations 28 may extend continuously in the longitudinal direction.

The features of the invention as disclosed in the preceding description, in the drawings, and in the claims may be essential to the realization of the invention in its different embodiments either alone or in any given combinations.

LIST OF REFERENCE NUMBERS

10 Inner tube
12 Outer tube
14 Injection lance
16 Injection molding tool access openings
18 Feed tubes
20 Distributing tubes
22 Mouths
23 Inner surface
24 Sliding elements
25 Outer surface
26 Table leg
28 Indentations

The invention claimed is:

1. A method for producing a sliding guide for guiding an inner tube in an outer tube movable relative thereto of a telescopic table frame part, comprising:

attaching of at least one sliding element made from a slide-promoting plastic onto the inner surface of the outer tube or onto the outer surface of the inner tube by injection molding, wherein the plastic is fed into the inside of the inner tube through an injection molding tool access opening in the same.

2. The method of claim 1 wherein the outer tube and the inner tube are interlocked prior to the injection molding.

3. The method of claim 1 wherein the injection molding tool and the inner tube are moved relative to each other so that the injection molding tool is situated inside the inner tube.

4. The method of claim 3 wherein the injection molding tool comprises an injection lance.

5. The method of claim 1 wherein the plastic is actively cured.

* * * * *